(12) United States Patent
Zhang et al.

(10) Patent No.: US 9,572,078 B2
(45) Date of Patent: Feb. 14, 2017

(54) METHOD FOR ACCESSING BASE STATION, BASE STATION, AND USER EQUIPMENT

(71) Applicant: Huawei Technologies Co., Ltd., Shenzhen, Guangdong (CN)

(72) Inventors: Jinfang Zhang, Shanghai (CN); Lu Rong, Shanghai (CN); Yinggang Du, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 361 days.

(21) Appl. No.: 13/895,021

(22) Filed: May 15, 2013

(65) Prior Publication Data

US 2014/0004863 A1    Jan. 2, 2014

Related U.S. Application Data

(63) Continuation of application No. PCT/CN2011/074218, filed on May 18, 2011.

(30) Foreign Application Priority Data

Nov. 15, 2010  (CN) .......................... 2010 1 0548361

(51) Int. Cl.
  *H04W 36/30*  (2009.01)
  *H04W 36/00*  (2009.01)
  (Continued)

(52) U.S. Cl.
  CPC ......... *H04W 36/30* (2013.01); *H04W 36/0033* (2013.01); *H04W 8/26* (2013.01);
  (Continued)

(58) Field of Classification Search
  CPC ............. H04W 36/30; H04W 36/0033; H04W 74/004; H04W 88/08; H04W 48/20; H04W 8/26; H04W 76/02; H04W 24/10; H04W 84/045
  See application file for complete search history.

(56) References Cited

U.S. PATENT DOCUMENTS

2010/0304748 A1* 12/2010 Henttonen et al. ........... 455/436
2010/0329206 A1* 12/2010 Thome ................ H04W 76/046
                                                           370/331

FOREIGN PATENT DOCUMENTS

CN   101447980 A   6/2009
CN   101616402 A   12/2009
(Continued)

OTHER PUBLICATIONS

International Search Report dated Aug. 25, 2011 in connection with International Patent Application No. PCT/CN2011/074218.

*Primary Examiner* — Marcos Torres

(57) ABSTRACT

Embodiments of the present invention disclose a method for accessing a base station, a base station and a user equipment, belonging to the field of communications technologies. The method includes: establishing, by a current macro base station, a control plane connection with a user equipment according to an access request of the user equipment, and assigning a first cell-radio network temporary identity to the user equipment; and when receiving a measurement report of pico base stations reported by the user equipment, selecting a pico base station for the user equipment according to a preset policy so that the user equipment establishes a data plane connection with the pico base station, and notifying context information of the user equipment to the pico base station, where the context information includes the first cell-radio network temporary identity assigned to the user equipment.

12 Claims, 13 Drawing Sheets

---

101: A current macro base station establishes a control plane connection with a user equipment according to an access request of the user equipment, and assigns a first cell-radio network temporary identity to the user equipment

↓

102: When receiving a measurement report of pico base stations reported by the user equipment, select a pico base station for the user equipment according to a preset policy so that the user equipment establishes a data plane connection with the pico base station, and notify context information of the user equipment to the pico base station, where the context information includes the first cell-radio network temporary identity assigned to the user equipment

↓

103: When an area where the user equipment is located is not covered by any pico base station or no pico base station is selected for the user equipment, the current macro base station establishes a data plane connection with the user equipment

(51) Int. Cl.
    *H04W 8/26*           (2009.01)
    *H04W 24/10*         (2009.01)
    *H04W 48/20*         (2009.01)
    *H04W 74/00*         (2009.01)
    *H04W 76/02*         (2009.01)
    *H04W 88/08*         (2009.01)
    *H04W 84/04*         (2009.01)

(52) U.S. Cl.
    CPC ............ *H04W 24/10* (2013.01); *H04W 48/20* (2013.01); *H04W 74/004* (2013.01); *H04W 76/02* (2013.01); *H04W 84/045* (2013.01); *H04W 88/08* (2013.01)

(56) References Cited

FOREIGN PATENT DOCUMENTS

| | | |
|---|---|---|
| CN | 101658057 A | 2/2010 |
| CN | 101772108 A | 7/2010 |
| CN | 101816209 A | 8/2010 |

\* cited by examiner

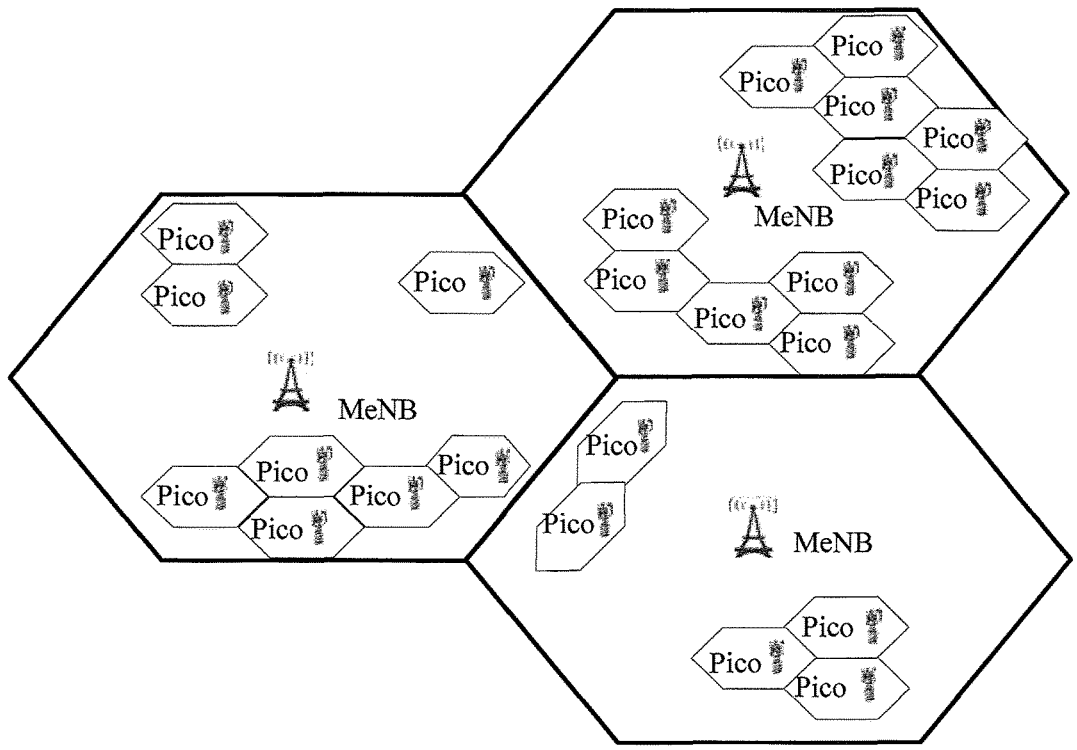

FIG. 1A

101: A current macro base station establishes a control plane connection with a user equipment according to an access request of the user equipment, and assigns a first cell-radio network temporary identity to the user equipment 102: When receiving a measurement report of pico base stations reported by the user equipment, select a pico base station for the user equipment according to a preset policy so that the user equipment establishes a data plane connection with the pico base station, and notify context information of the user equipment to the pico base station, where the context information includes the first cell-radio network temporary identity assigned to the user equipment 103: When an area where the user equipment is located is not covered by any pico base station or no pico base station is selected for the user equipment, the current macro base station establishes a data plane connection with the user equipment

FIG. 1B

METHOD FOR ACCESSING BASE STATION, BASE STATION, AND USER EQUIPMENT

CROSS-REFERENCE TO RELATED APPLICATIONS

This application is a continuation of International Application No. PCT/CN2011/074218, filed on May 18, 2011, which claims priority to Chinese Patent Application No. 201010548361.1, filed on Nov. 15, 2010, both of which are hereby incorporated by reference in their entireties.

TECHNICAL FIELD

The present invention relates to the field of communications technologies, and in particular, to a method for accessing a base station, a base station and a user equipment.

BACKGROUND

In a second generation communications system, users' information exchange demands mainly focus on voice calls and short messages, which have a modest requirement for spectrum efficiency. The system is mainly restricted by the size of a coverage area. Therefore, a networking mode of macro base stations is generally used. The base stations are far from each other. This networking mode features a low cost. With the development of the third and fourth generation communications systems, data transmission has become a new demand, especially real-time transmission of video. This, however, has an increasingly high requirement for spectrum efficiency and network throughput. A macro base station covers a large area and is capable of serving a large number of users. Therefore, the throughput of the macro base station is greatly restricted. When the macro base station covers one or more densely-populated areas, an even higher requirement is presented for the macro network throughput. In this case, single-layer coverage of the macro base station only meets users' basic voice service demand, and cannot meet the high-speed data transmission demand. Obviously, the existing networking mode of the macro base station cannot meet users' demands for high-speed data transmission.

Considering the defect of the macro base station, a solution provided in the prior art uses a multi-layer heterogeneous network architecture involving both a macro base station and a pico base station at a hot spot (referring to FIG. 1A). The macro base station provides a large-scale continuous wide coverage, and the pico base station provides coverage for a hot spot area. Users access the macro base station in an area having only the macro base station network, and take precedence to access the pico base station in an area covered by both the macro base station network and the pico base station network, for offloading the traffic of the macro base station network and obtaining better services. The macro base station and the pico base station are two independent networks. When a user chooses to access a base station the base station establishes both a control plane connection and a data plane connection with the user, provides air interface radio transmission for the user, and assigns and maintains for the user a unique cell-radio network temporary identity C-RNTI (Cell-Radio Network Temporary Identity, cell-radio network temporary identity) under the base station for identifying an RRC (Radio Resource Control, radio resource control) connection and uniquely identifying the user in scheduling. When the user is handed over between base stations, a source base station sends context information of a user equipment such as the C-RNTI identity to a target base station over a backbone network; the target base station assigns a new C-RNTI identity to the user, and notifies the user of updating the C-RNTI identity over an air interface through the source base station; and the C-RNTI identity maintained by the source base station is released after a successful base station handover.

After analysis on the prior art, the inventors find that the prior art has at least the following disadvantages.

In the multi-layer heterogeneous network architecture, because the coverage area of a pico base station is small, during moving of the user equipment, each time the user equipment accesses a pico base station, the pico base station needs to assign a new cell-radio network temporary identity C-RNTI to the user equipment, and notify the user of updating the C-RNTI through radio transmission. This not only reduces the efficiency of the base station, but also increases information transmission of the backbone network and radio network and reduces the utilization rate of radio resources.

SUMMARY

Embodiments of the present invention provide a method for accessing a base station a base station and a user equipment. The technical solutions are as follows.

A method for accessing an base station includes:
establishing, by a current macro base station, a control plane connection with a user equipment according to an access request of the user equipment, and assigning a first cell-radio network temporary identity to the user equipment; and when receiving a measurement report of pico base stations reported by the user equipment, selecting a pico base station for the user equipment according to a preset policy so that the user equipment establishes a data plane connection with the pico base station, and notifying context information of the user equipment to the pico base station, where the context information includes the first cell-radio network temporary identity assigned to the user equipment.

A method for accessing an base station includes:
establishing a control plane connection with a macro base station, and receiving a cell-radio network temporary identity assigned by the macro base station; and reporting a monitored measurement report of pico base stations, accessing a pico base station selected by the macro base station according to the measurement report of the pico base stations, and establishing a data plane connection with the pico base station selected by the macro base station, where the pico base station obtains the cell-radio network temporary identity of a user by receiving context information of a user equipment forwarded by the macro base station.

An base station includes:
a control plane connection establishing module, configured to establish a control plane connection with a user equipment according to an access request of the user equipment, and assign a first cell-radio network temporary identity to the user equipment; and a first identifier maintaining module, configured to, when receiving a measurement report of pico base stations reported by the user equipment, select a pico base station for the user equipment according to a preset policy so that the user equipment establishes a data plane connection with the pico base station, and notify context information of the user equipment to the pico base station, where the context information includes the first cell-radio network temporary identity assigned to the user equipment.

A user equipment includes:

a first connection establishing module, configured to establish a control plane connection with a macro base station, and receive a cell-radio network temporary identity assigned by the macro base station; and a second connection establishing module, configured to report a monitored measurement report of pico base stations, access a pico base station selected by the macro base station according to the measurement report of the pico base stations, and establish a data plane connection with the pico base station selected by the macro base station, where the pico base station obtains the cell-radio network temporary identity of a user by receiving context information of the user equipment forwarded by the macro base station.

The technical solutions provided in the embodiments of the present invention have the following beneficial effects.

According to the present invention, for a scenario where both a macro base station network and a pico base station network are deployed for coverage, the macro base station performs unified access control and assigns the cell-radio network temporary identity. This greatly speeds up the access process and the subsequent handover process, effectively reduces the call drop probability for a user moving fast, and improves efficiency of the base station and utilization rate of radio resources.

BRIEF DESCRIPTION OF THE DRAWINGS

FIG. 1A is a schematic diagram of a multi-layer heterogeneous network architecture involving both a macro base station and a pico base station at a hot spot.

FIG. 1B is a flowchart of a method for accessing an base station according to an embodiment of the present invention;

DETAILED DESCRIPTION

Figure 2:
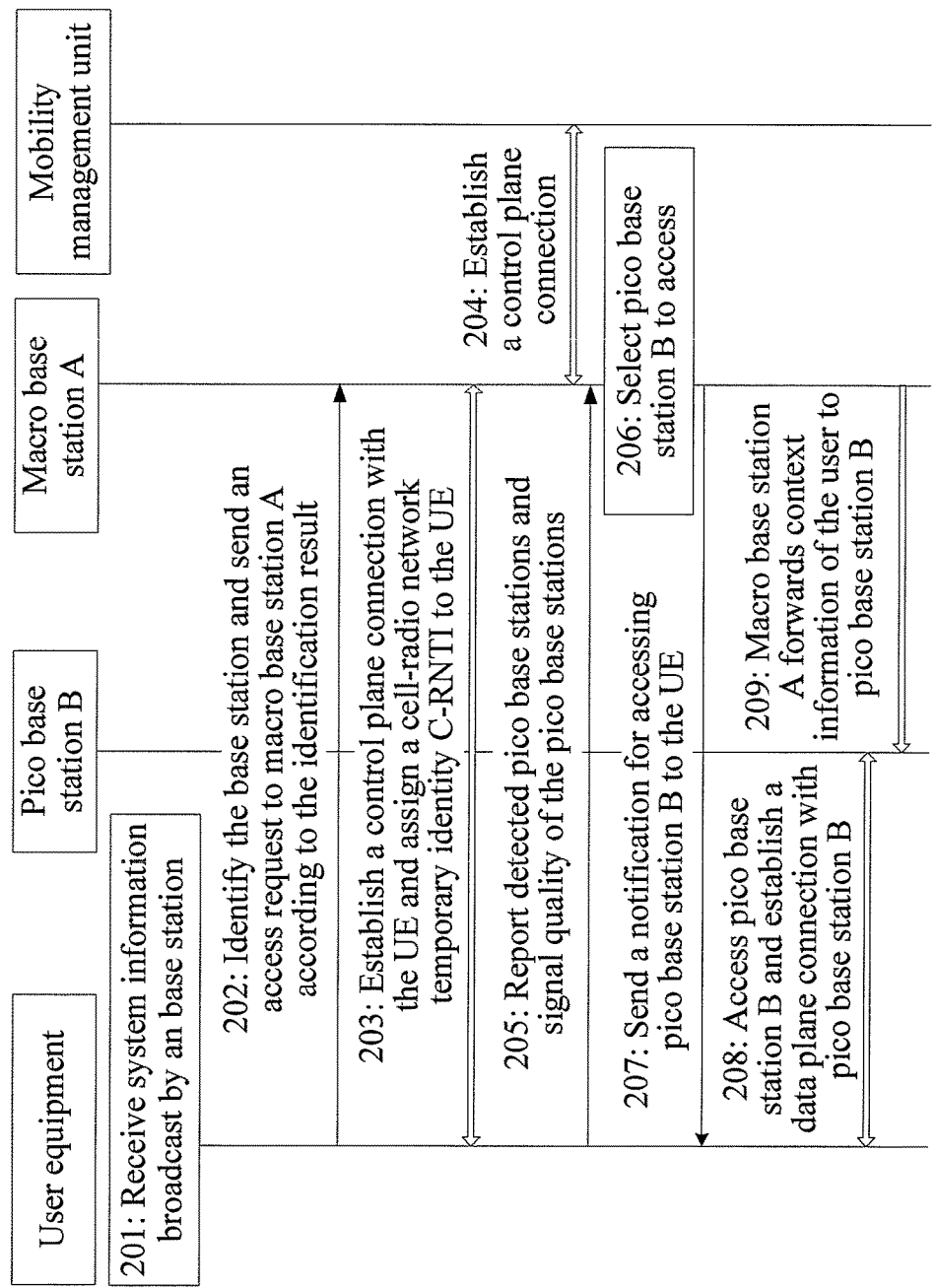
FIG. 2 is a flowchart of a method for accessing an base station according to an embodiment of the present invention.

To make the objective, technical solutions, and advantages of the present invention clearer, the following section describes the embodiments of the present invention in further detail with reference to the accompanying drawings.

Before description of the method for accessing a base station provided in the present invention, the following briefly describes basic knowledge involved in the present invention.

Different from an IMSI (International mobile subscriber identity, international mobile subscriber identity)/TMSI (Temporary mobile subscriber identity, temporary mobile subscriber identity) in a core network for identifying a user, in a radio network, 16 bits are used to identify an RRC connection and uniquely identify a mobile user during transmission. The identifiers are mainly as follows.

Temporary C-RNTI: Assigned by a serving base station during random access for identifying different users. After receiving collision solution success feedback returned by the base station, a user upgrades the Temporary C-RNTI to a C-RNTI.

C-RNTI (Cell-Radio Network Temporary Identity, cell-radio network temporary identity): As described above, after random access, the base station upgrades the Temporary C-RNTI to the C-RNTI. During a call, as long as a user stays in a cell covered by a source base station without handover to another base station, the C-RNTI value remains unchanged. If the user moves to a cell covered by another base station, the target base station assigns a new C-RNTI identity to the user. After the call of the user ends, the C-RNTI identity is released.

Semi-persistent Scheduling C-RNTI: used similarly to the C-RNTI. This identifier is used only when the semi-persistent scheduling mode is used.

Embodiment 1

To improve efficiency of a base station and utilization rate of radio resources, the embodiment of the present invention provides a method for accessing a base station. Referring to FIG. 1B, the method includes the following steps.

101: A current macro base station establishes a control plane connection with a user equipment according to an access request of the user equipment, and assigns a first cell-radio network temporary identity to the user equipment.

102: When receiving a measurement report of pico base stations reported by the user equipment, select a pico base station for the user equipment according to a preset policy so that the user equipment establishes a data plane connection with the pico base station, and notify context information of the user equipment to the pico base station, where the context information includes the first cell-radio network temporary identity assigned to the user equipment.

In an embodiment, the method further includes the following step.

103: When an area where the user equipment is located is not covered by any pico base station or no pico base station is selected for the user equipment, the current macro base station establishes a data plane connection with the user equipment.

The situation that the area where the user equipment is located is not covered by any pico base station refers to that the area where the user equipment is located is covered only by the macro base station; and the situation that no pico base station is selected for the user equipment refers to that no pico base station is applicable to the current user equipment for use among the pico base stations reported by the user equipment upon a judgment of the macro base station.

According to the present invention, for a scenario where both a macro base station network and a pico base station network are deployed for coverage, the macro base station performs unified access control and assigns the cell-radio network temporary identity. This greatly speeds up the access process and the subsequent handover process, effectively reduces the call drop probability for a user moving fast, and improves efficiency of the base station and utilization rate of radio resources.

Embodiment 2

To improve efficiency of a base station and utilization rate of radio resources, the embodiment of the present invention provides a method for accessing a base station. In the embodiment of the present invention, a base station to be initially accessed by a user is covered by both a macro base station network and a pico base station network. Therefore, when accessing the base station, the user needs to establish a control plane connection and a data plane connection with the macro base station and the pico base station respectively. Referring to FIG. 2, the method includes the following steps.

201: A UE (User Equipment, user equipment), after accessing a base station receives system information broadcast by the base station.

In the embodiment of the present invention, the system information broadcast by the base station includes: a bandwidth, a frame sequence number, and so on. The system information is specifically used for selecting a channel during user access and used in a subsequent communication process. This part is similar to the existing process, and is not detailed here.

202: The UE identifies the base station and sends an access request to macro base station A according to the identification result.

In step 202, the identification of the base station by the UE may be: identifying the base station by using an identifier of a physical-layer base station. For example, in formula $N_{ID}^{cell}=3N_{ID}^{(1)}+N_{ID}^{(2)}$ indicating an identifier of a physical-layer base station, NID(1) is an integer ranging from 0 to 167, indicating an identifier group of physical-layer base stations; NID(2) is an integer ranging from 0 to 2, indicating an identifier of a physical-layer base station in the identifier group of the physical-layer base stations. In this case, the macro base station and the pico base station may be indicated respectively by selecting different values of NID(1) and NID(2). For example, if NID(1)=1, the base station is a macro base station, and other values of NID(1) indicate a pico base station; or if NID(2)=0, the base station is a macro base station, and other values of NID(2) indicate a pico base station. The user achieves time-frequency synchronization during base station search, and at the same time obtains the values of NID(1) and NID(2) and determines the type of the base station according to the values of NID(1) and NID(2). After identifying the type of the base station, the UE sends an access request to the macro base station.

203: After receiving the access request, macro base station A establishes a control plane connection with the UE and assigns a cell-radio network temporary identity C-RNTI to the UE.

In this step, macro base station A establishes the control plane connection with the UE according to the access request of the user equipment, and assigns a first cell-radio network temporary identity to the UE. In the embodiment of the present invention, the first cell-radio network temporary identity is specifically the cell-radio network temporary identity C-RNTI.

In the embodiment of the present invention, steps 202 to 203 are a process of identifying the type of the base station and sending the access request to the macro base station according to the identification result by the UE. In another embodiment, this process may be replaced by the following: When the UE accesses a cell covered by both the macro base station network and the pico base station network, according to a cell access control policy, the UE sends the access request to the base station having a high RSRP (Reference Signal Receiving Power, reference signal receiving power) or RSRQ (Reference Signal Receiving Quality, reference signal receiving quality) value that is measured. If the RSRP/RSRQ value of the macro base station is high, the macro base station assigns the C-RNTI identity, and establishes the control plane connection. If the RSRP/RSRQ value of the pico base station is high, the pico base station denies/does not respond to (that is, denies or does not respond to) the access request, and the UE initiates an access request again to the base station whose RSRP/RSRQ value is the second highest till the macro base station covering the cell together with the pico base station is found.

During the process, only the macro base station accepts and processes the access request initiated by the UE. Once the pico base station receives the access request, the pico base station denies/does not respond to the access request so that when accessing the network, the UE first establishes a control plane connection with the macro base station and the macro base station assigns the cell-radio network temporary identity C-RNTI to the UE.

204: Macro base station A establishes a control plane connection to an MME (Mobility Management Entity, mobility management unit).

Persons skilled in the art may know that after authentication is performed for user validity and QoS, the control plane connection from macro base station A to the MME may be established.

205: The UE reports detected pico base stations and signal quality of the pico base stations to macro base station A to which the control plane connection is established.

206: After receiving the report of the UE, macro base station A selects pico base station B for the UE to access.

In the embodiment of the present invention, the factors considered during the selection of the pico base station for the UE to access include load of the base station, the user's service, and moving speed of the user.

207: Macro base station A sends a notification for accessing pico base station B to the UE.

208: After receiving the notification sent by macro base station A, the UE accesses pico base station B and establishes a data plane connection with pico base station B.

209: Macro base station A forwards context information of the user equipment to pico base station B, where the context information includes the cell-radio network temporary identity C-RNTI assigned to the user.

In the embodiment of the present invention, steps 203 to 209 are a network access process of the user in the scenario where both the macro base station and the pico base station are deployed for coverage. After that, the UE and pico base station B use the cell-radio network temporary identity C-RNTI obtained in step 209 to uniquely identify the UE during uplink and downlink scheduling.

It should be noted that, when the user accesses the network, the user may selectively access the base station according to the speed of the user. When the speed of the user equipment exceeds a preset threshold, that is, the user equipment is a high-speed user equipment, the high-speed user equipment may establish a data plane connection and a control plane connection with the macro base station. In addition, the speed of the user equipment is ever changing. Once the speed of the high-speed user equipment falls below the preset threshold, the macro base station may control the user equipment to connect the data plane to a specified pico base station according to the measurement report reported by the high-speed user equipment. In addition, an Idle (idle) user may only receive control information of the macro base station to keep in touch with the macro base station for ease of instruction from the macro base station to the idle user. Once the Idle user becomes active, the user firstly establishes a control plane connection with the macro base station, and the macro base station instructs the user to establish a data plane connection with the specified pico base station or the macro base station for further communication.

In steps 205 to 209, when a measurement report of pico base stations reported by the user equipment is received, a pico base station is selected for the user equipment according to a preset policy so that the user equipment establishes a data plane connection with the pico base station, and context information of the user equipment is notified to the pico base station, where the context information of the user equipment includes the first cell-radio network temporary identity assigned to the user equipment.

After step 209, the UE has established the control plane connection with macro base station A, and has established the data plane connection with pico base station B. When the UE moves, current macro base station A judges, according to the measurement report reported by the user equipment, whether to perform an base station handover, and if yes, instructs, according to the types of a source base station and a target base station, the user equipment to hand over the data plane connection or the control plane connection to the target base station.

In view of the coverage of the macro base station and the pico base station, the following three scenarios may occur.

Figure 3A:
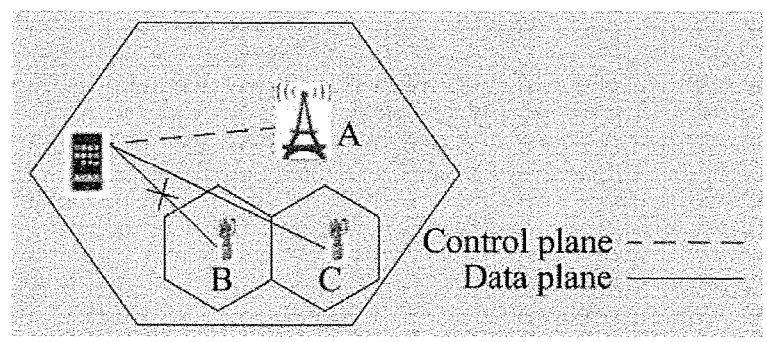
FIG. 3A is a schematic diagram of a scenario according to an embodiment of the present invention.

(1) Referring to FIG. 3A, the source base station and the target base station are both pico base stations covered by the current macro base station, that is, the UE moves from one pico base station to another pico base station within the range of the same macro base station. This is a case where one macro base station covers multiple pico base stations, and the UE moves from one pico base station to another within the coverage of the macro base station.

In this case, the current macro base station maintains the control plane connection, and sends a first handover instruction to the UE. The first handover instruction is used to instruct the UE to hand over the data plane connection between the UE and the source base station to the target base station.

Figure 3B:
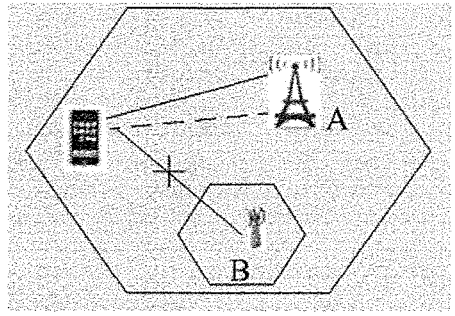
FIG. 3B is a schematic diagram of another scenario according to an embodiment of the present invention.

(2) Referring to FIG. 3B, the source base station is a pico base station covered by the current macro base station, and the target base station is the current macro base station, that is, the UE moves from a pico base station within the range of a macro base station to the macro base station. This is a case where one macro base station covers at least one pico base station, and the UE moves from the inside of the pico base station to the outside of the pico base station, but still within the range of the macro base station.

In this case, the current macro base station maintains the control plane connection, and sends a first handover instruction to the UE. The first handover instruction is used to instruct the UE to hand over the data plane connection between the UE and the source base station to the target base station.

Figure 3C:
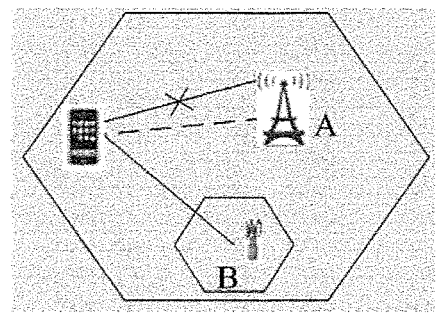
FIG. 3C is a schematic diagram of still another scenario according to an embodiment of the present invention.

(3) Referring to FIG. 3C, the source base station is the current macro base station and the target base station is a pico base station covered by the current macro base station, that is, the UE moves from an area outside the pico base station covered by the macro base station to the inside of the pico base station. This is a case where one macro base station covers at least one pico base station, and the UE moves from an area outside the pico base station to an area inside the pico base station, but still within the range of the macro base station.

In this case, the current macro base station maintains the control plane connection, and sends a first handover instruction to the UE. The first handover instruction is used to instruct the UE to hand over the data plane connection between the UE and the source base station to the target base station.

Figure 4:
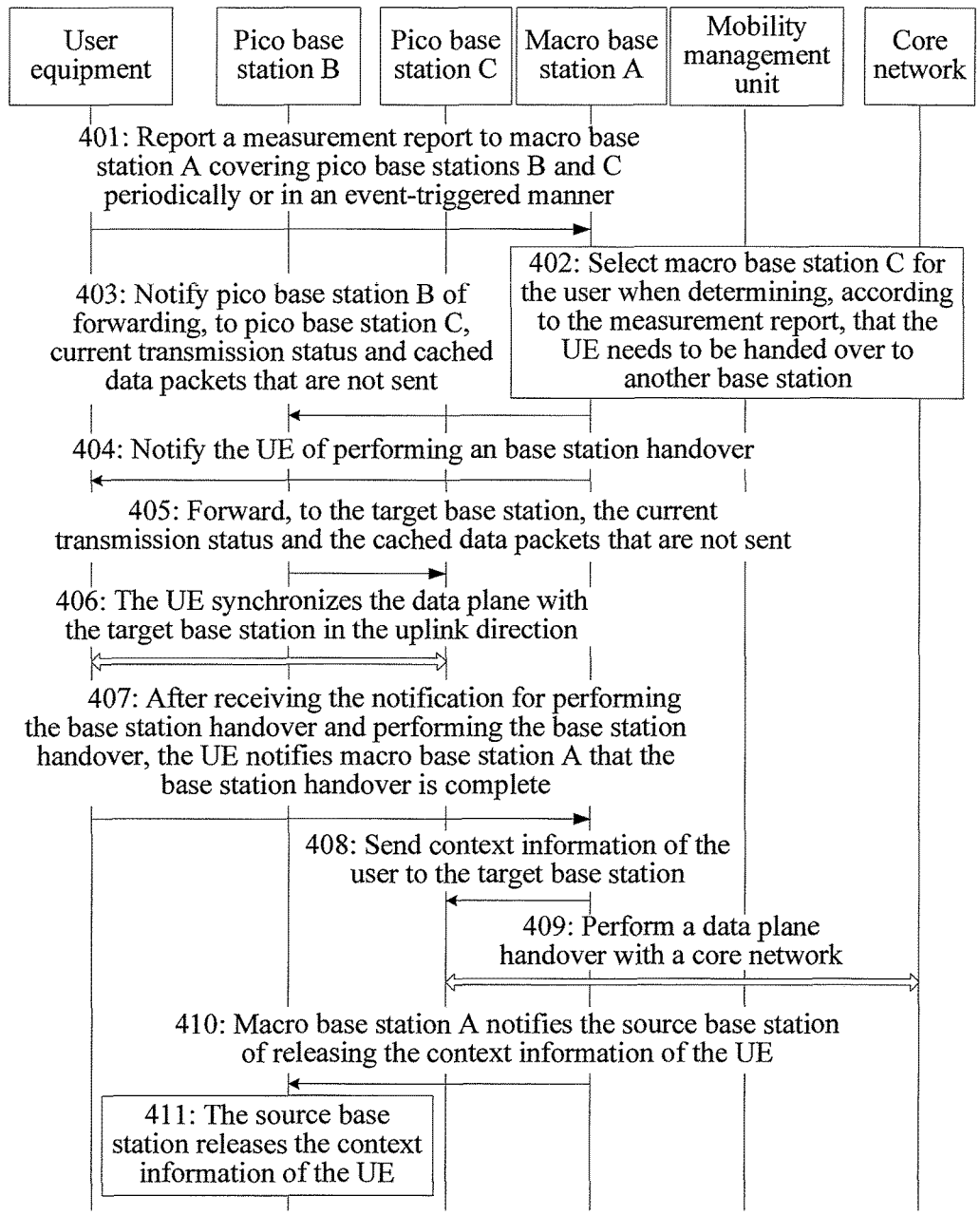
FIG. 4 is a flowchart of a method for accessing an base station in the scenario illustrated in FIG. 3A according to an embodiment of the present invention.

As regards Scenario (1), referring to FIG. 4, FIG. 4 is a flow chart of accessing an base station when a UE moves from one pico base station to another pico base station within the range of the same macro base station. As shown in FIG. 4, in this embodiment, the scenario where the UE moves from one pico base station to another pico base station within the range of the same macro base station is used as an example for describing in detail the technical solution provided in this embodiment. The method according to this embodiment includes the following steps.

401: A UE reports a measurement report to macro base station A covering pico base stations B and C periodically or in an event-triggered manner.

Mobility of the user equipment requires continuously sending a measurement report to an base station serving the user equipment. For example, in an LTE (Long Term Evolution, long term evolution) system, the user equipment needs to send an A2 event measurement report. The A2 event measurement report mainly includes RSRP or RSRQ. The base station judges whether the user equipment needs to be handed over according to such information.

In the embodiment of the present invention, step 401 is the process that the UE detects the signal quality of a serving base station and a neighboring base station and reports channel status to the currently serving base station.

402: Macro base station A receives the measurement report, and selects pico base station C for the user when determining, according to the measurement report, that the UE needs to be handed over to another base station.

Steps 401 to 402 are the process of judging, according to the measurement report reported by the user equipment, whether to perform an base station handover. In the embodiment of the present invention, macro base station A selects a target base station according to a preset policy and an access control policy. The specific process of determining, by the base station according to the measurement report sent by the user equipment, whether the user equipment needs to be handed over is the same as that in the prior art, and is not detailed here. In addition, macro base station A has resource utilization and user information of all pico base stations within the range of the macro base station. The macro base station selects the target base station and performs access control. Different from the prior art, this step omits sending handover request signaling by a source base station to the target base station, and meanwhile omits sending handover request acknowledgment signaling by the target base station to the source base station, thereby saving the handover time.

In an embodiment, macro base station A has the resource utilization and user information of all pico base stations within the range of the macro base station. That is, macro base station A has the resource utilization and user information of the macro base station and all pico base stations within the range of the macro base station.

403: Macro base station A notifies the source base station (that is, pico base station B) of forwarding, to the target base station (that is, pico base station C), current transmission status and cached data packets that are not sent.

404: Macro base station A notifies the UE of performing an base station handover, that is, macro base station A sends a first handover instruction to the UE.

405: After receiving a forwarding notification from macro base station A, the source base station forwards, to the target base station, the current transmission status and the cached data packets that are not sent.

In the embodiment of the present invention, when moving within the range of the same macro base station, the UE maintains a control plane connection with the macro base station. When a pico base station handover is needed, only a data plane connection is handed over to the target base station.

406: The UE synchronizes the data plane with the target base station in the uplink direction.

407: After receiving the notification for performing the base station handover and performing the base station handover, the UE notifies macro base station A that the base station handover is complete.

408: After receiving the notification from the UE, macro base station A sends context information of the user equipment to the target base station, where the context information of the user equipment includes a first cell-radio network temporary identity C-RNTI assigned to the UE.

In the embodiment of the present invention, through step 408, the macro base station notifies the cell-radio network temporary identity C-RNTI used by the UE to the target base station, without requiring the target base station to reassign a C-RNTI and deliver it to the user for update through the source base station. This greatly improves the efficiency of the base station, reduces signaling information exchange during the communication, and saves air interface sources.

409: The target base station performs a data plane handover with a core network.

Steps 401 to 409 are the process of the base station handover. After this process, the following steps may be included.

410: Macro base station A notifies the source base station of releasing the context information of the UE.

411: The source base station releases the context information of the UE.

In conclusion, when the source base station and the target base station are both pico base stations covered by the current macro base station, the control plane connection is maintained, and the first handover instruction (that is, the instruction used for notifying the handover in step 404) is sent to the user equipment, where the first handover instruction is used to instruct the user equipment to hand over the data plane connection between the user equipment and the source base station to the target base station. Optionally, the method further includes: notifying the first cell-radio network temporary identity of the user equipment to the target base station.

Figure 5:
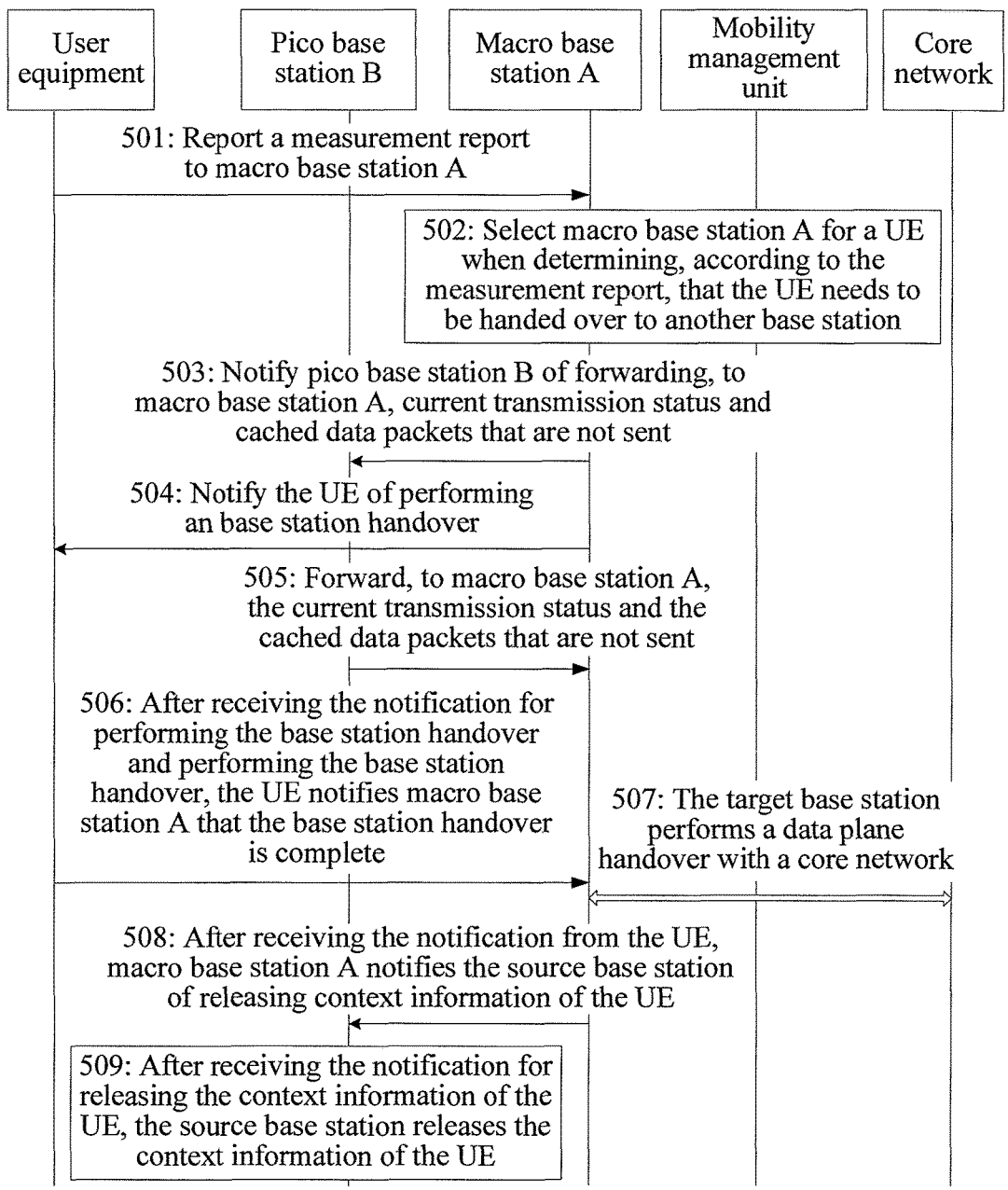
FIG. 5 is a flowchart of a method for accessing an base station in the scenario illustrated in FIG. 3B according to an embodiment of the present invention.

As regards Scenario (2), referring to FIG. 5, FIG. 5 is a flow chart of accessing an base station when a UE moves from a pico base station within the range of a macro base station to the macro base station. As shown in FIG. 5, in this embodiment, the scenario where the UE moves from a pico base station within the range of a macro base station to the macro base station is used as an example for describing in detail the technical solution provided in this embodiment. The method according to this embodiment includes the following steps.

501: After entering from an area of pico base station B within the range of macro base station A into an area outside pico base station B, a UE reports a measurement report to macro base station A.

502: Macro base station A receives the measurement report, and selects macro base station A for the UE when determining, according to the measurement report, that the UE needs to be handed over to another base station.

In the embodiment of the present invention, when the UE enters into an area outside pico base station B within macro base station A, macro base station A selects a target base station according to an access control policy. The specific process of determining, by the base station according to the measurement report sent by the user equipment, whether the user equipment needs to be handed over is the same as that in the prior art, and is not detailed here. In addition, macro base station A has resource utilization and user information of all pico base stations within the range of the macro base station. The macro base station selects the target base station and performs access control. This step omits sending handover request signaling by a source base station to the target base station, and meanwhile omits sending handover request acknowledgment signaling by the target base station to the source base station, thereby saving the handover time.

In an embodiment, macro base station A has the resource utilization and user information of all pico base stations within the range of the macro base station. That is, macro base station A has the resource utilization and user information of the macro base station and all pico base stations within the range of the macro base station.

503: Macro base station A notifies the source base station (that is, pico base station B) of forwarding, to the target base station (that is, macro base station A), current transmission status and cached data packets that are not sent.

504: Macro base station A notifies the UE of performing an base station handover, that is, macro base station A sends a first handover instruction to the UE.

505: After receiving a forwarding notification from macro base station A, pico base station B forwards, to macro base station A, the current transmission status and the cached data packets that are not sent.

In the embodiment of the present invention, when moving within the range of the same macro base station, the UE maintains a control plane connection with the macro base station. When an base station handover is needed, only a data plane is handed over to the target base station.

506: After receiving the notification for performing the base station handover and performing the base station handover, the UE notifies macro base station A that the base station handover is complete.

507: The target base station performs a data plane handover with a core network.

508: After receiving the notification from the UE, macro base station A notifies the source base station of releasing context information of the UE.

In the embodiment of the present invention, macro base station A has obtained the context information of the UE, and has been synchronized. Therefore, signaling for processing the context information and synchronization is also omitted.

509: After receiving the notification for releasing the context information of the UE, the source base station releases the context information of the UE.

In conclusion, when the source base station is a pico base station covered by the current macro base station, and the target base station is the current macro base station, the control plane connection is maintained, and the first handover instruction (that is, the instruction used for notifying the handover in step 504) is sent to the user equipment, where the first handover instruction is used to instruct the user equipment to hand over the data plane connection between the user equipment and the source base station to the target base station.

Figure 6:
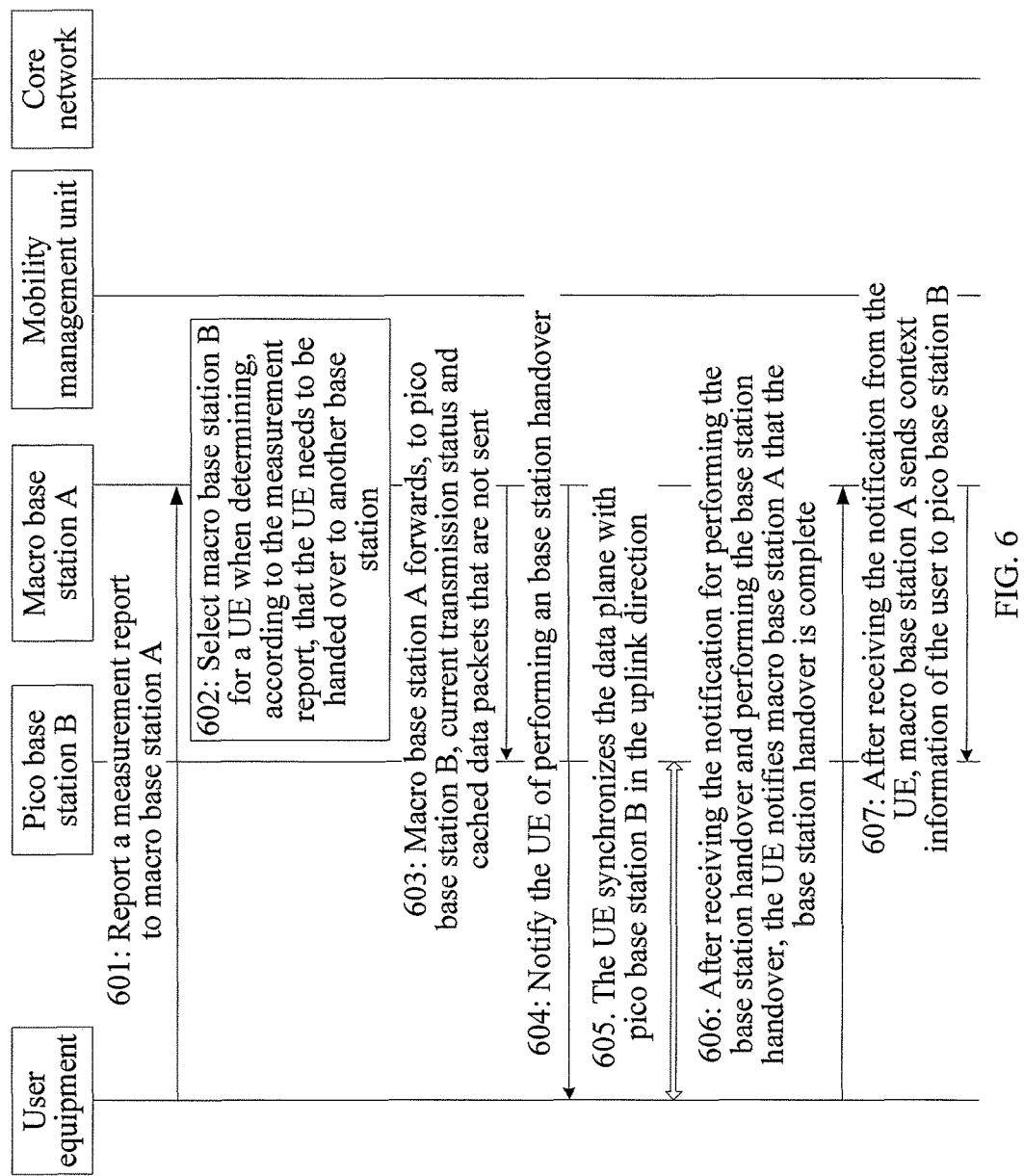
FIG. 6 is a flowchart of a method for accessing an base station in the scenario illustrated in FIG. 3C according to an embodiment of the present invention.

As regards Scenario (3), referring to FIG. 6, FIG. 6 is a flow chart of accessing an base station when a UE moves from an area outside a pico base station within a macro base station to the pico base station. As shown in FIG. 6, in this embodiment, the scenario where the UE moves from an area outside a pico base station within a macro base station to the pico base station is used as an example for describing in detail the technical solution provided in this embodiment. The method according to this embodiment includes the following steps.

601: After entering from an area outside pico base station B within the range of macro base station A into an area of pico base station B, a UE reports a measurement report to macro base station A.

602: Macro base station A receives the measurement report, and selects pico base station B for the UE when determining, according to the measurement report, that the UE needs to be handed over to another base station.

In the embodiment of the present invention, when the UE enters into the area of pico base station B within macro base station A, macro base station A selects a target base station according to an access control policy. The specific process of determining, by the base station according to the measurement report sent by the user equipment, whether the user equipment needs to be handed over is the same as that in the prior art, and is not detailed here. In addition, macro base station A has resource utilization and user information of all pico base stations within the range of the macro base station. The macro base station selects the target base station and performs access control. This step omits sending handover request signaling by a source base station to the target base station, and meanwhile omits sending handover request acknowledgment signaling by the target base station to the source base station, thereby saving the handover time.

In an embodiment, macro base station A has the resource utilization and user information of all pico base stations within the range of the macro base station. That is, macro base station A has the resource utilization and user information of the macro base station and all pico base stations within the range of the macro base station.

603: Macro base station A forwards, to the target base station (that is, pico base station B), current transmission status and cached data packets that are not sent.

604: Macro base station A notifies the UE of performing an base station handover, that is, macro base station A sends a first handover instruction to the UE.

605: The UE synchronizes a data plane with the target base station (that is, pico base station B) in the uplink direction.

606: After receiving the notification for performing the base station handover and performing the base station handover, the UE notifies macro base station A that the base station handover is complete.

607: After receiving the notification from the UE, macro base station A sends context information of the user equipment to the target base station (pico base station B), where the context information of the user equipment includes a first cell-radio network temporary identity C-RNTI assigned to the UE.

Steps 601 to 607 differ from steps 501 to 509 in that macro base station A needs to send the context information of the user equipment including the C-RNTI to pico base station B for use in a subsequent call control process. In addition, because the source base station is a macro base station performing access control, the releasing step is not needed.

In conclusion, when the source base station is the current macro base station and the target base station is a pico base station covered by the current macro base station, the control plane connection is maintained, and the first handover instruction (that is, the instruction used for notifying the handover in step 604) is sent to the user equipment, where the first handover instruction is used to instruct the user equipment to hand over the data plane connection between the user equipment and the source base station to the target base station. Optionally, the method further includes: notifying the first cell-radio network temporary identity of the user equipment to the target base station.

In the above three embodiments, when the source base station and the target base station are both pico base stations covered by the current macro base station, the first cell-radio network temporary identity of the user equipment is notified to the target base station; when the source base station is the current macro base station and the target base station is a pico base station covered by the current macro base station, the first cell-radio network temporary identity of the user equipment is notified to the target base station. In this way, exchange of handover request signaling between the source pico base station and the target pico base station is omitted, and the macro base station performs unified access control and directly sends a handover instruction to the user. This greatly speeds up the handover process, effectively reduces the call drop probability for a user moving fast, and improves efficiency of the base station and utilization rate of radio resources. In addition, the cell-radio network temporary identity C-RNTI is maintained. In this way, the functions of the pico base station may be simplified, and the information does not need to be delivered to the user over an air interface through the source pico base station, reducing overhead of a backbone network and radio resources.

In an embodiment, when a source base station is a current macro base station, a target base station is a second macro base station, and a pico base station establishing a data plane connection with a UE crosses the current macro base station and the second macro base station, the current macro base station maintains the data plane connection between the pico base station and the UE, and sends a second handover instruction to the UE, where the second handover instruction is used to instruct the UE to hand over a control plane connection from the current macro base station to the second macro base station. In this case, the specific process is as follows.

Figure 7:
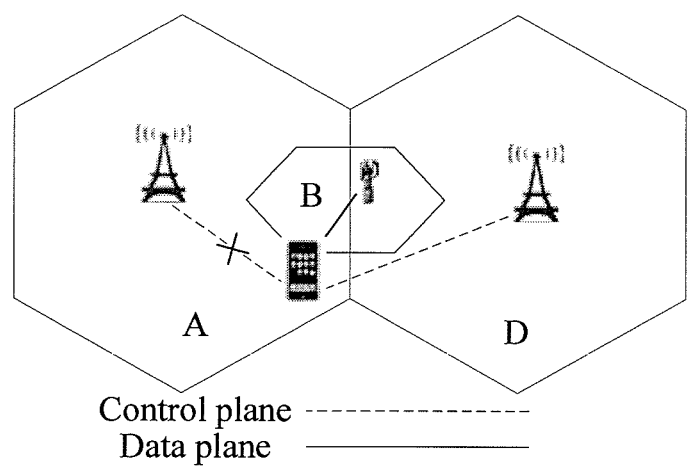
FIG. 7 is a schematic diagram of still another scenario according to an embodiment of the present invention.

As shown in FIG. 7, when the source base station and the target base station are the same pico base station B crossing two macro base stations A and D, the control plane of the user equipment is handed over from the first macro base station A where the source base station B is located to the second macro base station D where the target base station is located. Still taking FIG. 7 as an example, in another embodiment, when the source base station and the target base station are two macro base stations A and D, the control plane of the user equipment is handed over from the first macro base station A to the second macro base station D.

Figure 8:
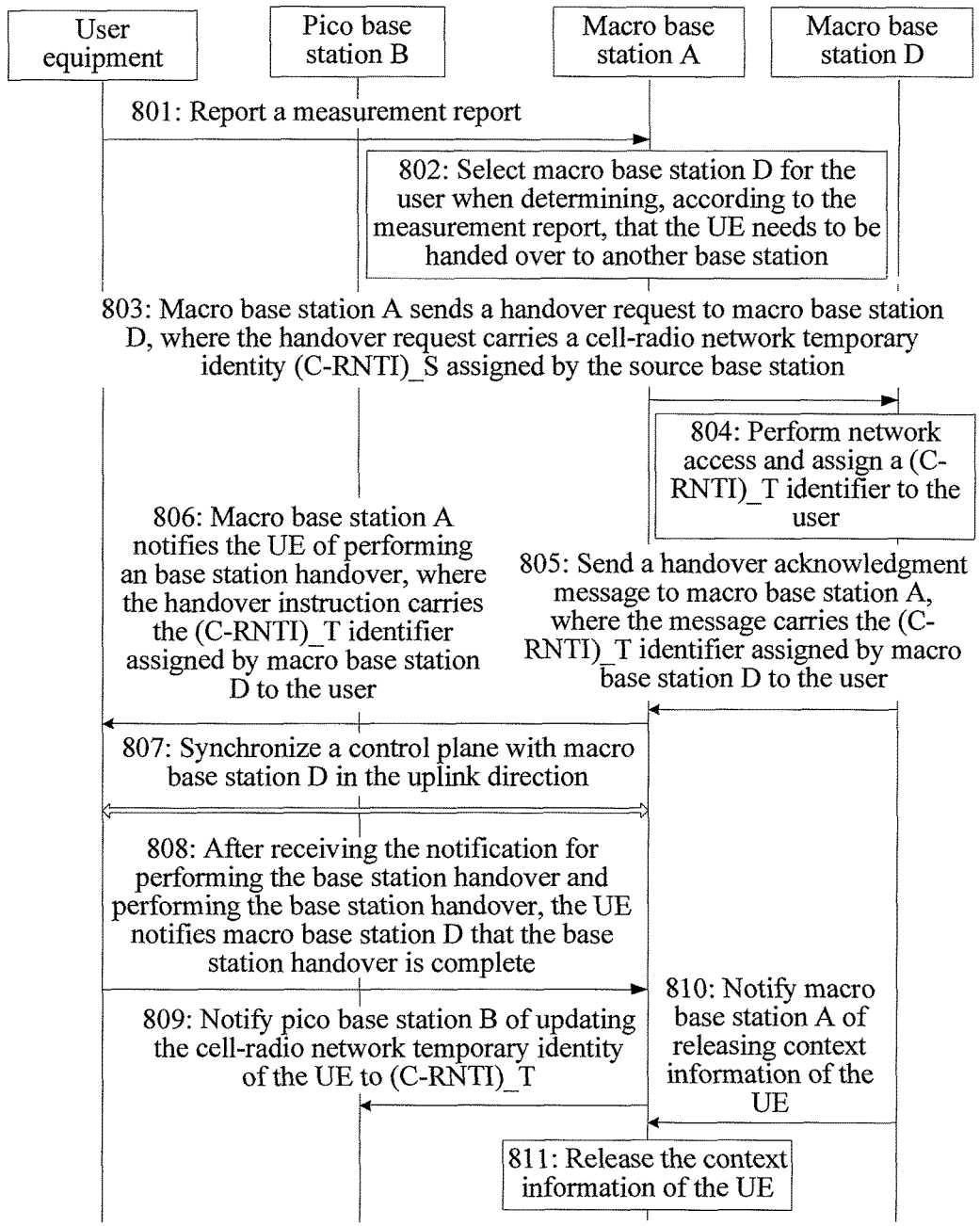
FIG. 8 is a flowchart of a method for accessing an base station in the scenario illustrated in FIG. 7 according to an embodiment of the present invention.

Specifically, in the scenario where one pico base station crosses multiple macro base stations, when a user performs a handover between multiple macro base stations within the coverage of the same pico base station, the data plane connection originally established with the pico base station is maintained, and only the control plane connection is handed over from the source macro base station to the target macro base station. Referring to FIG. 8, the method according to this embodiment includes the following steps.

801: A UE reports a measurement report to a currently serving macro base station A (that is, a source base station) periodically or in an event-triggered mode.

802: Macro base station A receives the measurement report, and selects macro base station D (that is, a target base station) for a user when determining, according to the measurement report, that the UE needs to be handed over to another base station.

803: Macro base station A sends a handover request to macro base station D, where the handover request carries a cell-radio network temporary identity (C-RNTI)_S assigned by the source base station, the suffix S indicating that the cell-radio network temporary identity is assigned by the source base station.

804: After receiving the handover request, macro base station D performs network access and assigns a (C-RNTI)_T identifier to the user, the suffix T indicating the cell-radio network temporary identity (C-RNTI)_T reassigned by the target base station.

The target base station does not need to reassign data plane radio transmission resources to the user. Therefore, the access control originally performed at the target base station side is simplified to network access here. That is, only control link transmission resources need to be assigned.

805: Macro base station D sends a handover acknowledgment message to macro base station A, where the message carries the (C-RNTI)_T identifier assigned by macro base station D to the user.

806: Macro base station A notifies the UE of performing an base station handover, that is, macro base station A sends a second handover instruction to the UE, where the handover instruction carries the (C-RNTI)_T identifier assigned by macro base station D to the user.

The target base station reassigns a (C-RNTI)_T identifier to the user, and updates the cell-radio network temporary identity of the user through the source base station (macro base station A).

807: After receiving the notification for the base station handover, the UE synchronizes a control plane with macro base station D in the uplink direction.

808: After receiving the notification for performing the base station handover and performing the base station handover, the UE notifies macro base station D that the base station handover is complete.

809: After the UE establishes a control plane connection with macro base station D, macro base station D notifies pico base station B of updating the cell-radio network temporary identity of the UE to (C-RNTI)_T.

It should be noted that, the (C-RNTI)_T notified by macro base station D is the second cell-radio network temporary identity described in the embodiment of the present invention. Persons skilled in the art may know that in the subsequent data scheduling, the second cell-radio network temporary identity (C-RNTI)_T is used to uniquely identify the user equipment.

810: Macro base station D notifies macro base station A of releasing context information of the UE.

The context information includes a first cell-radio network temporary identity.

811: Macro base station A releases the context information of the UE.

In conclusion, when the source base station is the current macro base station, the target base station is a second macro base station, and the pico base station establishing the data plane connection with the user equipment crosses the current macro base station and the second macro base station, the data plane connection between the pico base station and the user equipment is maintained, and a second handover instruction (that is, the instruction used for notifying the handover in step 806) is sent to the user equipment, where the second handover instruction is used to instruct the user equipment to hand over the control plane connection from the current macro base station to the second macro base station.

It should be noted that, the handover process only involves the handover of the control plane connection, and the data plane connection of the user is kept. Therefore, no line-drop occurs, and user data transmission is not affected. In the embodiment of the present invention, when receiving an base station handover request from another macro base station (that is, macro base station A), macro base station D assigns a second cell-radio network temporary identity to the user equipment, and notifies the second cell-radio network temporary identity to the another macro base station so that the another macro base station updates the first cell-radio network temporary identity of the user equipment, where the base station handover request carries the first cell-radio network temporary identity assigned by the another base station to the user equipment. Optionally, the method further includes notifying the other macro base station of releasing the context information of the user equipment, where the context information includes the first cell-radio network temporary identity.

In an embodiment, when a source base station is a pico base station covered by a current macro base station, and a target base station is a pico base station covered by a third macro base station, the current macro base station sends a third handover instruction to the UE, where the third handover instruction is used to instruct the UE to hand over a data plane connection of the UE from the source base station to the target base station, and hand over a control plane connection from the current macro base station to the third macro base station. In this case, the specific process is as follows.

Figure 9:
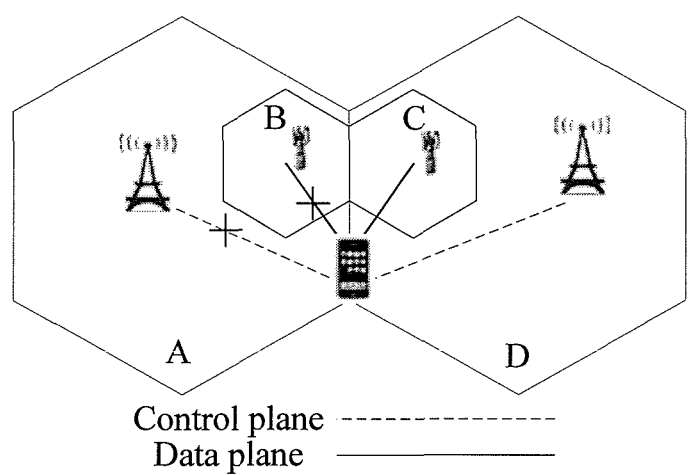
FIG. 9 is a schematic diagram of still another scenario according to an embodiment of the present invention.
Figure 10A:
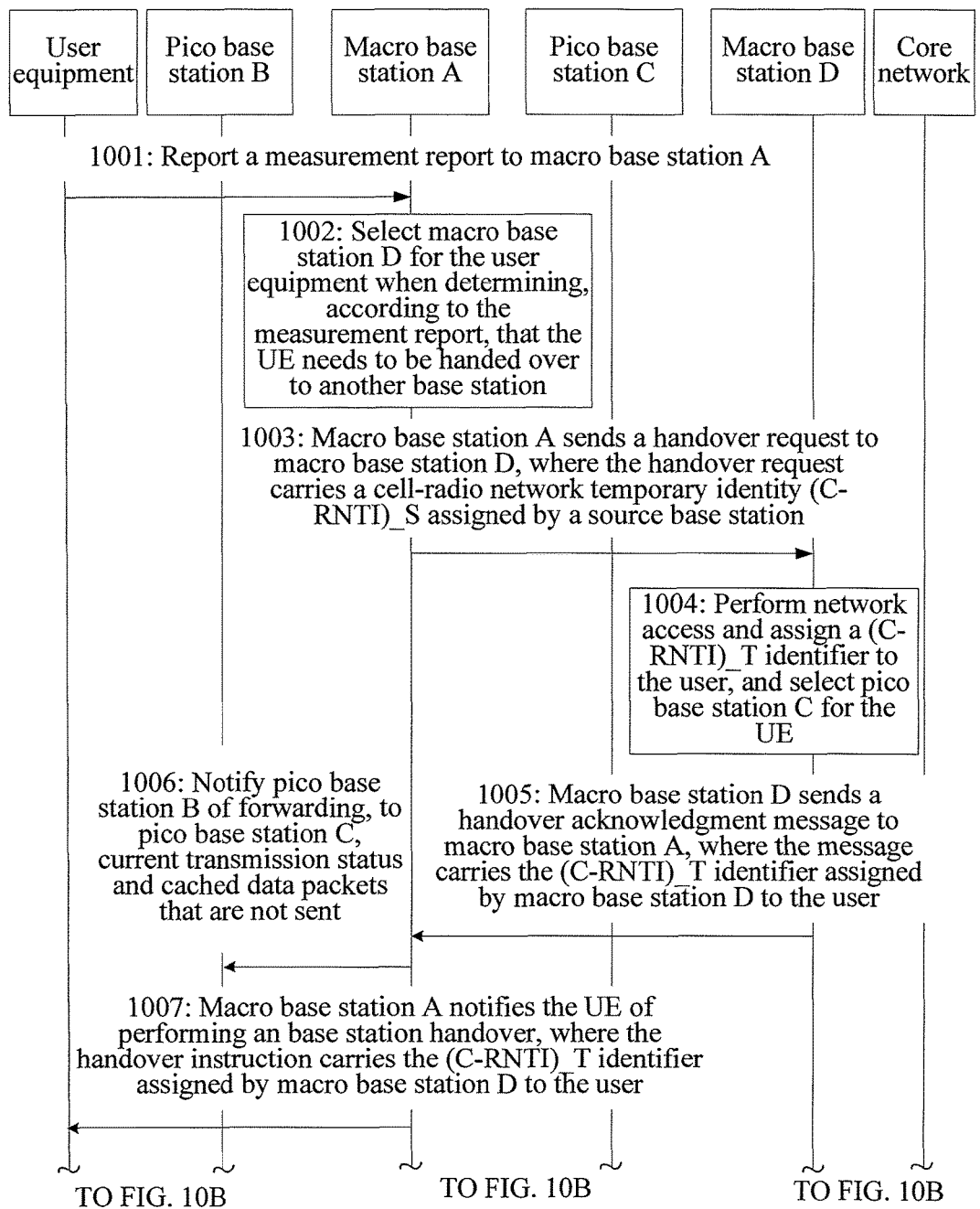
FIG. 10A and FIG. 10B are flowcharts of a method for accessing an base station in the scenario illustrated in FIG. 9 according to an embodiment of the present invention.
Figure 10B:
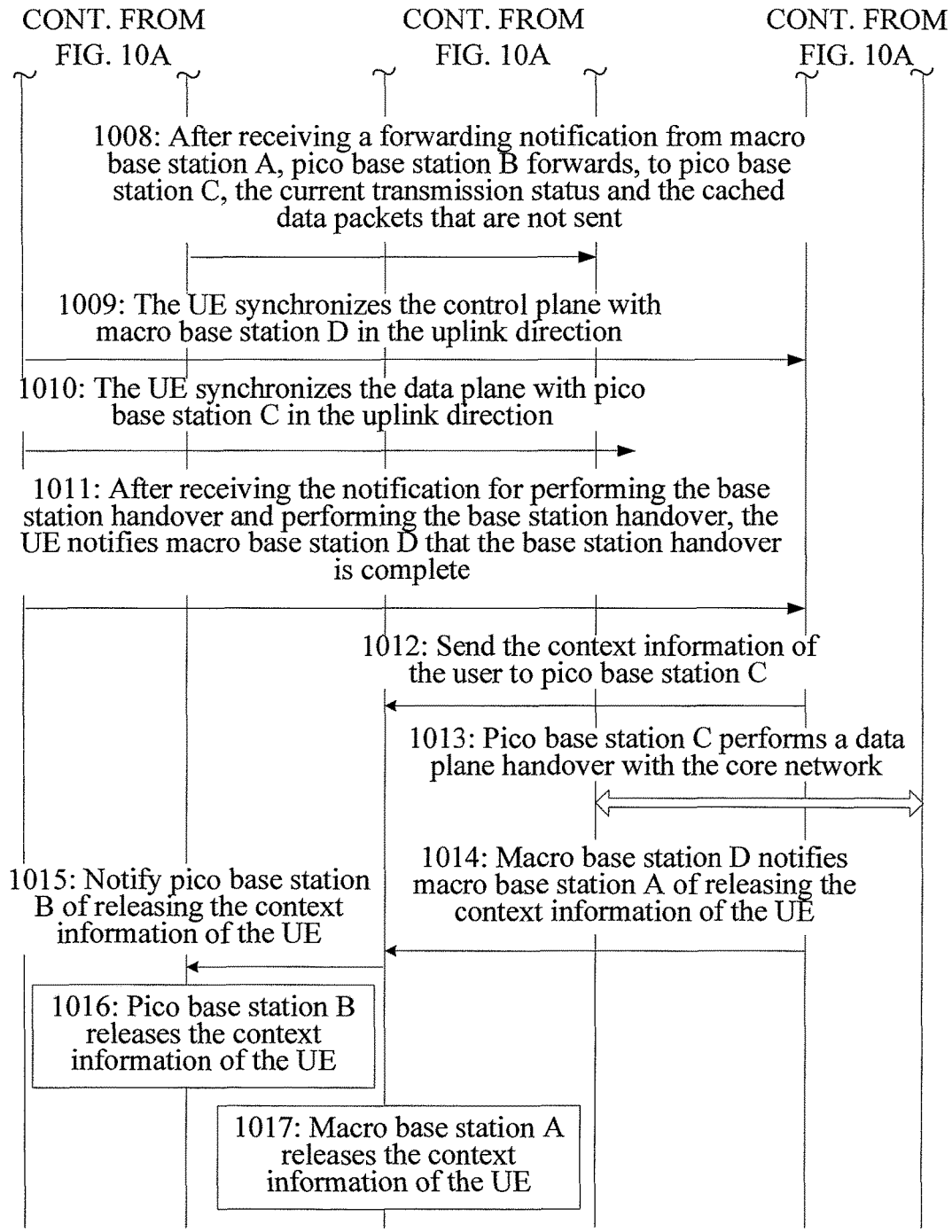

As shown in FIG. 9, the source base station and the target base station are respectively pico base stations within the coverage of different macro base stations. Specifically, a case where macro base station A covers pico base station B, macro base station D covers pico base station C, and a user moves from an area of pico base station B to an area of pico base station C is used as an example for description. Referring to FIG. 10, the method according to this embodiment includes the following steps.

1001: A UE reports a measurement report to macro base station A covering pico base station B.

1002: Macro base station A receives the measurement report, and selects macro base station D for the user equipment when determining, according to the measurement report, that the UE needs to be handed over to another base station.

1003: Macro base station A sends a handover request to macro base station D, where the handover request carries a cell-radio network temporary identity (C-RNTI)_S assigned by a source base station, the suffix S indicating that the cell-radio network temporary identity is assigned by the source base station.

1004: Macro base station D receives the handover request, performs network access, assigns a (C-RNTI)_T identifier to the user, and selects pico base station C for the UE according to an access control policy.

1005: Macro base station D sends a handover acknowledgment message to macro base station A, where the message carries the (C-RNTI)_T identifier assigned by macro base station D to the user.

1006: Macro base station A notifies pico base station B of forwarding, to pico base station C, current transmission status and cached data packets that are not sent.

1007: Macro base station A notifies the UE of performing an base station handover, that is, macro base station A sends a third handover instruction to the UE, where the handover instruction carries the (C-RNTI)_T identifier assigned by macro base station D to the user.

1008: After receiving a forwarding notification from macro base station A, pico base station B forwards, to pico base station C, the current transmission status and the cached data packets that are not sent.

1009: The UE synchronizes a control plane with macro base station D in the uplink direction.

1010: The UE synchronizes a data plane with pico base station C in the uplink direction.

1011: After receiving the notification for performing the base station handover and performing the base station handover (that is, handing over the control plane connection from macro base station A to macro base station D, and handing over the data plane connection from pico base station B to pico base station C), the UE notifies macro base station D that the base station handover is complete.

1012: After receiving the notification from the UE, macro base station D sends context information of the user equipment to pico base station C, where the context information of the user equipment includes the cell-radio network temporary identity (C-RNTI)_T.

1013: Pico base station C performs a data plane handover with a core network.

1014: Macro base station D notifies macro base station A of releasing the context information of the UE.

1015: Macro base station A notifies pico base station B of releasing the context information of the UE.

1016: Pico base station B releases the context information of the UE.

1017: Macro base station A releases the context information of the UE.

In this embodiment, when the source base station and the target base station are respectively pico base stations within the coverage of different macro base stations, the data plane of the user equipment is handed over from the source base station to the target base station, and the control plane of the user equipment is handed over from the macro base station covering the source base station to the macro base station covering the target base station. This process involves the data plane handover between pico base stations and the control plane handover between the macro base stations. The target base station (that is, the target macro base station) assigns a new C-RNTI to the user, notifies the UE of updating the C-RNTI, and uniquely identifies the UE during uplink and downlink scheduling according to the new C-RNTI.

In conclusion, when the source base station is a pico base station covered by the current macro base station and the target base station is a pico base station covered by a third macro base station, a third handover instruction is sent to the user equipment, where the third handover instruction is used to instruct the user equipment to hand over the data plane connection of the user equipment from the source base station to the target base station, and hand over the control plane connection from the current macro base station to the third macro base station.

Optionally, the method further includes notifying the current macro base station of releasing the context information of the user equipment, where the context information includes the first cell-radio network temporary identity.

In the embodiments of the present invention, the user control plane is connected to an MME through a macro base station, the user data plane is connected to an S-GW through a pico base station, and the two functional entities, namely, S-GW and MME, may be located in one physical entity or may be directly connected through a high-speed link or logically connected through a backbone network.

According to the present invention, for a scenario where both a macro base station network and a pico base station network are deployed for coverage, the macro base station performs unified access control and assigns the cell-radio network temporary identity. This greatly speeds up the access process and the subsequent handover process, effectively reduces the call drop probability for a user moving fast, and improves efficiency of the base station and utilization rate of radio resources. During the base station handover, the data plane or the control plane of the user equipment is handed over to the target base station according to the types of the source base station and the target base station. In addition, when the target base station is a pico base station within the coverage of the current macro base station covering the source base station, the cell-radio network temporary identity of the user equipment is notified to the target base station so that the cell-radio network temporary identity C-RNTI is maintained. In this way, the functions of the pico base station may be simplified, and the information does not need to be delivered to the user equipment over an air interface through the source base station, reducing overhead of a backbone network and radio resources. Further, part of the control functions, such as the user management and mobility management functions, of the user within the coverage of the pico base station are shifted from the pico base station up to the macro base station for centralized processing, omitting exchange of handover request signaling between the source pico base station and the target pico base station.

Embodiment 3

Figure 11:
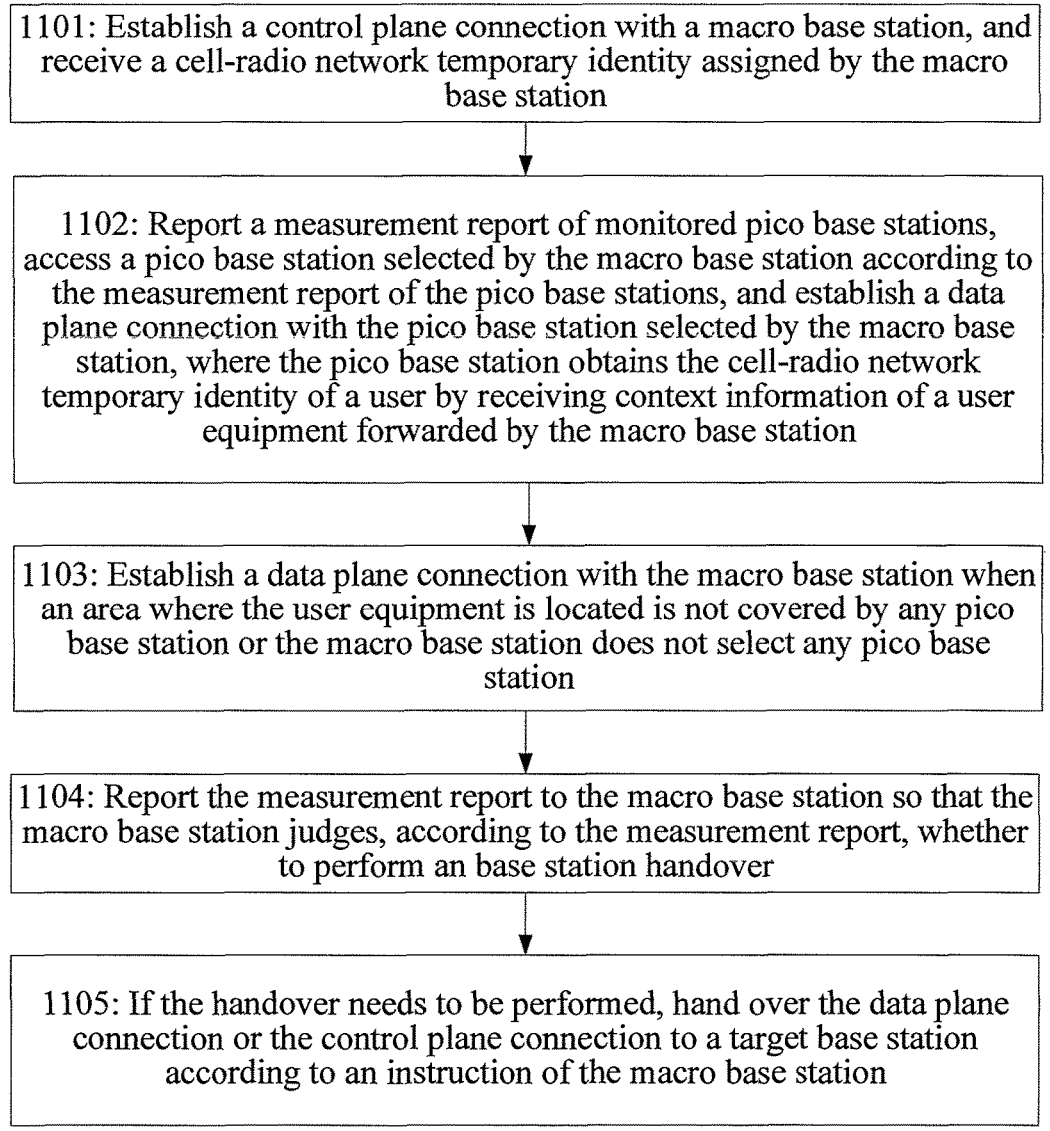
FIG. 11 is a flowchart of a method for accessing an base station according to an embodiment of the present invention.

To improve efficiency of a base station and utilization rate of radio resources, the embodiment of the present invention provides a method for accessing an base station. Referring to FIG. 11, the method includes the following steps.

1101: Establish a control plane connection with a macro base station, and receive a cell-radio network temporary identity assigned by the macro base station.

1102: Report a monitored measurement report of pico base stations, access a pico base station selected by the macro base station according to the measurement report of the pico base stations, and establish a data plane connection with the pico base station selected by the macro base station, where the pico base station obtains the cell-radio network temporary identity of a user by receiving context information of a user equipment forwarded by the macro base station.

In an embodiment, the method may further include the following step.

1103: Establish a data plane connection with the macro base station when an area where the user equipment is located is not covered by any pico base station or the macro base station does not select any pico base station.

The method may further include the following steps.

1104: Report the measurement report to the macro base station so that the macro base station judges, according to the measurement report, whether to perform an base station handover.

1105: If the handover needs to be performed, hand over the data plane connection or the control plane connection to a target base station according to an instruction of the macro base station.

In step 1105, the handing over the data plane connection or the control plane connection to the target base station according to the instruction of the macro base station specifically includes:

when receiving a first handover instruction from the macro base station, maintaining the control plane connection, and handing over the data plane connection to the target base station;

when receiving a second handover instruction from the macro base station, maintaining the data plane connection, and handing over the control plane connection to the target base station; and when receiving a third handover instruction from the macro base station, handing over the data plane connection from a source base station to the target base station, and handing over the control plane connection to a macro base station covering the target base station.

For a scenario where both a macro base station network and a pico base station network are deployed for coverage, the macro base station performs unified access control and assigns the cell-radio network temporary identity. This greatly speeds up the access process and the subsequent handover process, effectively reduces the call drop probability for a user moving fast, and improves efficiency of the base station and utilization rate of radio resources.

Embodiment 4

Figure 12:
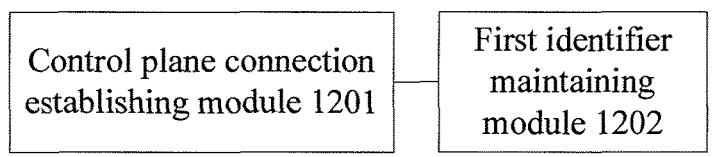
FIG. 12 is a schematic structural diagram of an base station according to an embodiment of the present invention.

To improve efficiency of a base station and utilization rate of radio resources, the embodiment of the present invention provides an base station. In the embodiment of the present invention, an base station to be initially accessed by a user is covered by both a macro base station network and a pico base station network. Therefore, when accessing the base station, the user needs to establish a control plane connection and a data plane connection with the macro base station and the pico base station respectively. Referring to FIG. 12, the base station includes:

a control plane connection establishing module 1202, configured to establish a control plane connection with a user equipment according to an access request of the user equipment, and assign a first cell-radio network temporary identity to the user equipment; and a first identifier maintaining module 1202, configured to, when receiving a measurement report of pico base stations reported by the user equipment, select a pico base station for the user equipment according to a preset policy so that the user equipment establishes a data plane connection with the pico base station, and notify context information of the user equipment to the pico base station, where the context information includes the first cell-radio network temporary identity assigned to the user equipment.

Figure 13:
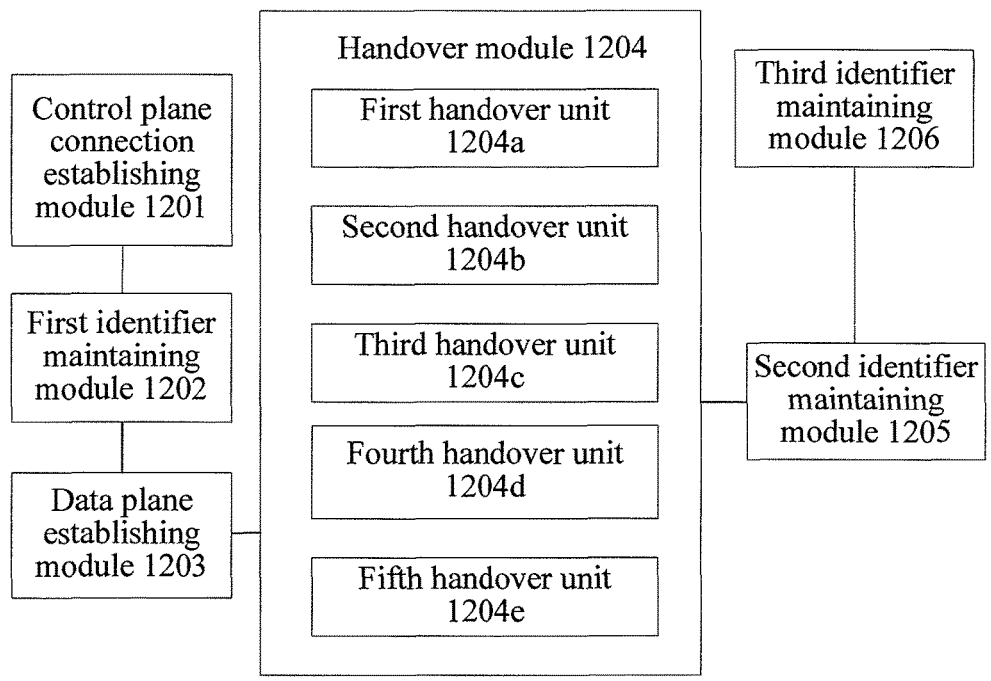
FIG. 13 is another schematic structural diagram of an base station according to an embodiment of the present invention.

Referring to FIG. 13, the base station further includes:

a data plane establishing module 1203, configured to establish a data plane connection with the user equipment when an area where the user equipment is located is not covered by any pico base station or no pico base station is selected for the user equipment.

The base station further includes:

a handover module 1204, configured to judge, according to the measurement report reported by the user equipment, whether to perform an base station handover, and if yes, instruct, according to types of a source base station and a target base station, the user equipment to hand over the data plane connection or the control plane connection to the target base station.

The handover module 1204 includes:

a first handover unit 1204a, configured to, when the source base station and the target base station are both pico base stations covered by the current macro base station, maintain the control plane connection, and send a first handover instruction to the user equipment, where the first handover instruction is used to instruct the user equipment to hand over the data plane connection between the user equipment and the source base station to the target base station;

a second handover unit 1204b, configured to, when the source base station is a pico base station covered by the current macro base station and the target base station is the current macro base station, maintain the control plane connection, and send a first handover instruction to the user equipment, where the first handover instruction is used to instruct the user equipment to hand over the data plane connection between the user equipment and the source base station to the target base station;

a third handover unit 1204c, configured to, when the source base station is the current macro base station and the target base station is a pico base station covered by the current macro base station, maintain the control plane connection, and send a first handover instruction to the user equipment, where the first handover instruction is used to instruct the user equipment to hand over the data plane connection between the user equipment and the source base station to the target base station;

a fourth handover unit 1204d, configured to, when the source base station is the current macro base station, the target base station is a second macro base station, and the pico base station establishing the data plane connection with the user equipment crosses the current macro base station and the second macro base station, maintain the data plane connection between the pico base station and the user equipment, and send a second handover instruction to the user equipment, where the second handover instruction is used to instruct the user equipment to hand over the control plane connection from the current macro base station to the second macro base station; and a fifth handover unit 1204e, configured to, when the source base station is a pico base station covered by the current macro base station and the target base station is a pico base station covered by a third macro base station, send, by the current macro base station, a third handover instruction to the user equipment, where the third handover instruction is used to instruct the user equipment to hand over the data plane connection of the user equipment from the source base station to the target base station, and hand over the control plane connection from the current macro base station to the third macro base station.

The base station further includes:

a second identifier maintaining module 1205, configured to, when the target base station is a pico base station within the coverage of the current macro base station, notify the first cell-radio network temporary identity of the user equipment to the target base station; and a third identifier maintaining module 1206, configured to, when receiving an base station handover request from another macro base station, assign a second cell-radio network temporary identity to the user equipment, and notify the second cell-radio network temporary identity to the another macro base station so that the another macro base station updates the first cell-radio network temporary identity of the user equipment, where the base station handover request carries the first cell-radio network temporary identity assigned by the another base station to the user equipment.

The third identifier maintaining module 1206 is further configured to notify the other base station of releasing the context information of the user equipment, where the context information includes the first cell-radio network temporary identity.

The base station, specifically a macro base station, provided in this embodiment is based on the same concept in the method embodiments. The specific implementation process of the base station can be seen in the description of the method embodiments, and is not detailed here.

Figure 14:
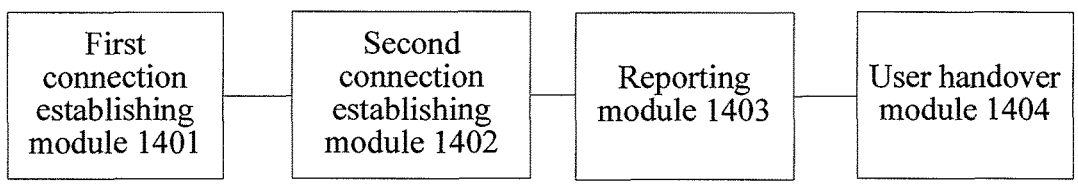
FIG. 14 is a schematic structural diagram of a user equipment according to an embodiment of the present invention.

Referring to FIG. 14, an embodiment of the present invention further provides a user equipment, including:

a first connection establishing module 1401, configured to establish a control plane connection with a macro base station, and receive a cell-radio network temporary identity assigned by the macro base station; and a second connection establishing module 1402, configured to report a monitored measurement report of pico base stations, access a pico base station selected by the macro base station according to the measurement report of the pico base stations, and establish a data plane connection with the pico base station selected by the macro base station, where the pico base station obtains the cell-radio network temporary identity of a user by receiving context information of the user equipment forwarded by the macro base station.

The second connection establishing module 1402 is further configured to establish a data plane connection with the macro base station when an area where the user equipment is located is not covered by a pico base station or the macro base station does not select any pico base station.

The user equipment further includes:

a reporting module 1403, configured to report the measurement report to the macro base station so that the macro base station judges, according to the measurement report, whether to perform an base station handover; and a user handover module 1404, configured to, if the handover needs to be performed, hand over the data plane connection or the control plane connection to a target base station according to an instruction of the macro base station.

The user handover module 1404 includes:

a first user handover unit, configured to, when receiving a first handover instruction from the macro base station, maintain the control plane connection, and hand over the data plane connection to the target base station;

a second user handover unit, configured to, when receiving a second handover instruction from the macro base station, maintain the data plane connection, and hand over the control plane connection to the target base station; and a third user handover unit, configured to, when receiving a third handover instruction from the macro base station, hand over the data plane connection from the source base station to the target base station, and hand over the control plane connection to a macro base station covering the target base station.

The user equipment, specifically a mobile phone, a palm-top, or a laptop, provided in this embodiment is based on the same concept in the method embodiments. The specific implementation process of the user equipment can be seen in the description of the method embodiments, and is not detailed here.

According to the present invention, for a scenario where both a macro base station network and a pico base station network are deployed for coverage, the macro base station performs unified access control and assigns the cell-radio network temporary identity. This greatly speeds up the access process and the subsequent handover process, effectively reduces the call drop probability for a user moving fast, and improves efficiency of the base station and utilization rate of radio resources. During the base station handover, the data plane or the control plane of the user equipment is handed over to the target base station according to the types of the source base station and the target base station. In addition, when the target base station is a pico base station within the coverage of the current macro base station covering the source base station, the cell-radio network temporary identity of the user equipment is notified to the target base station so that the cell-radio network temporary identity C-RNTI is maintained. In this way, the functions of the pico base station may be simplified, and the information does not need to be delivered to the user equipment over an air interface through the source base station, reducing overhead of a backbone network and radio resources.

The embodiments of the present invention can be implemented by using software. The corresponding software program may be stored in a readable storage medium, such as a hard disk, a cache, or an optical disk of a computer.

The above are merely exemplary embodiments of the present invention. The scope of the present invention is not limited thereto. Any modification, equivalent replacement, or improvement made without departing from the spirit and principle of the present invention shall fall within the protection scope of the present invention.

What is claimed is:

1. A method for accessing a base station, the method comprising:

establishing, by a current macro base station, a control plane connection with a user equipment according to an access request of the user equipment;

assigning a first cell-radio network temporary identity to the user equipment;

when receiving a measurement report of pico base stations reported by the user equipment, selecting a pico base station for the user equipment according to a preset policy so that the user equipment establishes a data plane connection with the pico base station, and notifying context information of the user equipment to the pico base station, wherein the context information comprises the first cell-radio network temporary identity assigned to the user equipment; and judging, by the current macro base station according to the measurement report reported by the user equipment, whether to perform a base station handover, and if yes, instructing, according to types of a source base station and a target base station, the user equipment to hand over the data plane connection or the control plane connection to the target base station;

wherein instructing, by the current macro base station according to the types of the source base station and the target base station, the user equipment to hand over the data plane connection or the control plane connection to the target base station, comprises:

when the source base station and the target base station are both pico base stations covered by the current macro base station, maintaining, by the current macro base station, the control plane connection, and sending a first handover instruction to the user equipment, wherein the first handover instruction is used to instruct the user equipment to hand over the data plane connection between the user equipment and the source base station to the target base station;

when the source base station is a pico base station covered by the current macro base station and the target base station is the current macro base station, maintaining, by the current macro base station, the control plane connection, and sending a first handover instruction to the user equipment, wherein the first handover instruction is used to instruct the user equipment to hand over the data plane connection between the user equipment and the source base station to the target base station;

when the source base station is the current macro base station and the target base station is a pico base station covered by the current macro base station, maintaining, by the current macro base station, the control plane connection, and sending a first handover instruction to the user equipment, wherein the first handover instruction is used to instruct the user equipment to hand over the data plane connection between the user equipment and the source base station to the target base station; and when the source base station is the current macro base station, the target base station is a second macro base station, and the pico base station establishing the data plane connection with the user equipment crosses the current macro base station and the second macro base station, maintaining, by the current macro base station, the data plane connection between the pico base station and the user equipment, and sending a second handover instruction to the user equipment, wherein the second handover instruction is used to instruct the user equipment to hand over the control plane connection from the current macro base station to the second macro base station.

2. The method according to claim 1, further comprising:
when an area where the user equipment is located is not covered by any pico base station or no pico base station is selected for the user equipment, establishing, by the current macro base station, a data plane connection with the user equipment.

3. The method according to claim 1, wherein instructing, according to the types of the source base station and the target base station, the user equipment to hand over the data plane connection or the control plane connection to the target base station, further comprises:
when the source base station is a pico base station covered by the current macro base station and the target base station is a pico base station covered by a third macro base station, sending, by the current macro base station, a third handover instruction to the user equipment, wherein the third handover instruction is used to instruct the user equipment to hand over the data plane connection of the user equipment from the source base station to the target base station, and hand over the control plane connection from the current macro base station to the third macro base station.

4. The method according to claim 1, further comprising:
when the target base station is a pico base station within the coverage of the current macro base station, notifying, by the current macro base station, the first cell-radio network temporary identity of the user equipment to the target base station.

5. The method according to claim 1, further comprising:
when receiving a base station handover request from another macro base station, assigning, by the current macro base station, a second cell-radio network temporary identity to the user equipment, and notifying the second cell-radio network temporary identity to the other macro base station so that the other macro base station updates the first cell-radio network temporary identity of the user equipment, wherein the base station handover request carries the first cell-radio network temporary identity assigned by the other base station to the user equipment.

6. The method according to claim 5, wherein after the notifying the second cell-radio network temporary identity to the target base station, the method further comprises:
notifying, by the current macro base station, the other macro base station of releasing the context information of the user equipment, wherein the context information comprises the first cell-radio network temporary identity.

7. A base station comprising:
a control plane connection establishing module, configured to establish a control plane connection with a user equipment according to an access request of the user equipment, and assign a first cell-radio network temporary identity to the user equipment;

a first identifier maintaining module, configured to, when receiving a measurement report of pico base stations reported by the user equipment, select a pico base station for the user equipment according to a preset policy so that the user equipment establishes a data plane connection with the pico base station, and notify context information of the user equipment to the pico base station, wherein the context information comprises the first cell-radio network temporary identity assigned to the user equipment; and a handover module, configured to judge, according to the measurement report reported by the user equipment, whether to perform a base station handover, and if yes, instruct, according to types of a source base station and a target base station, the user equipment to hand over the data plane connection or the control plane connection to the target base station;

wherein the handover module comprises:
a first handover unit, configured to, when the source base station and the target base station are both pico base stations covered by the current macro base station, maintain the control plane connection, and send a first handover instruction to the user equipment, wherein the first handover instruction is used to instruct the user equipment to hand over the data plane connection between the user equipment and the source base station to the target base station;

a second handover unit, configured to, when the source base station is a pico base station covered by the current macro base station and the target base station is the current macro base station, maintain the control plane connection, and send a first handover instruction to the user equipment, wherein the first handover instruction is used to instruct the user equipment to hand over the data plane connection between the user equipment and the source base station to the target base station;

a third handover unit, configured to, when the source base station is the current macro base station and the target base station is a pico base station covered by the current macro base station, maintain the control plane connection, and send a first handover instruction to the user equipment, wherein the first handover instruction is used to instruct the user equipment to hand over the data plane connection between the user equipment and the source base station to the target base station; and a fourth handover unit, configured to, when the source base station is the current macro base station, the target base station is a second macro base station, and the pico base station establishing the data plane connection with the user equipment crosses the current macro base station and the second macro base station, maintain the data plane connection between the pico base station and the user equipment, and send a second handover instruction to the user equipment, wherein the second handover instruction is used to instruct the user equipment to hand over the control plane connection from the current macro base station to the second macro base station.

8. The base station according to claim 7, further comprising:
a data plane establishing module, configured to establish a data plane connection with the user equipment when an area where the user equipment is located is not covered by any pico base station or no pico base station is selected for the user equipment.

9. The base station according to claim 7, wherein the handover module further comprises:
a fifth handover unit, configured to, when the source base station is a pico base station covered by the current macro base station and the target base station is a pico base station covered by a third macro base station, send, by the current macro base station, a third handover instruction to the user equipment, wherein the third handover instruction is used to instruct the user equipment to hand over the data plane connection of the user equipment from the source base station to the target base station, and hand over the control plane connection from the current macro base station to the third macro base station.

10. The base station according to claim 7, further comprising:
a second identifier maintaining module, configured to, when the target base station is a pico base station covered by the current macro base station, notify the first cell-radio network temporary identity of the user equipment to the target base station.

11. The base station according to claim 7, further comprising:
a third identifier maintaining module, configured to, when receiving a base station handover request from another macro base station, assign a second cell-radio network temporary identity to the user equipment, and notify the second cell-radio network temporary identity to the other macro base station so that the other macro base station updates the first cell-radio network temporary identity of the user equipment, wherein the base station handover request carries the first cell-radio network temporary identity assigned by the other base station to the user equipment.

12. The base station according to claim 11, wherein the third identifier maintaining module is further configured to notify the other base station of releasing the context information of the user equipment, wherein the context information comprises the first cell-radio network temporary identity.

* * * * *